United States Patent [19]

Wefer

[11] 4,438,171

[45] Mar. 20, 1984

[54] COEXTRUDED PRODUCT OF AES-THERMOPLASTIC GRAFT COPOLYMER

[75] Inventor: John M. Wefer, Newtown, Conn.

[73] Assignee: Uniroyal, Inc., New York, N.Y.

[21] Appl. No.: 406,599

[22] Filed: Aug. 9, 1982

[51] Int. Cl.³ .......................... B32B 7/02; B32B 27/08
[52] U.S. Cl. ............................... 428/215; 156/244.11;
        428/216; 428/220; 428/517; 428/519; 428/521
[58] Field of Search ............... 428/215, 216, 517, 519,
                                    428/521, 220; 156/244.11

[56] References Cited

U.S. PATENT DOCUMENTS 4,202,948  5/1980  Peasco .................................... 525/70

Primary Examiner—Marion McCamish
Attorney, Agent, or Firm—James J. Long

[57] ABSTRACT

Laminate comprising AES of the dicyclopentadiene type coextruded onto a thermoplastic resin layer such as ABS.

7 Claims, No Drawings

COEXTRUDED PRODUCT OF AES-THERMOPLASTIC GRAFT COPOLYMER

This invention relates to a coextruded AES thermoplastic, and more particularly to a coextruded product in which a layer of AES is coextruded onto a layer of another thermoplastic resin, the said AES comprising a graft copolymer of resin forming monomeric material on a rubbery EPDM spine, in which the EPDM is based on dicyclopentadiene as the copolymerizable non-conjugated diene.

AES compositions based on EPDM in which the non-conjugated diene termonomer is dicyclopentadiene (DCPD) are thermoplastics possessing high impact strength and excellent weatherability. They can be molded into a variety of useful shapes, and articles so molded retain much of their strength after outdoor exposure. Unfortunately, such AES compositions have poor processability in the area of extruded sheet. The sheet tends to have an objectionable rippled surface, sometimes referred to as "nerve." Even when processing conditions are adjusted so that the nerve is not readily apparent in the extruded sheet, such as by smoothing the sheet with embossing rolls in the sheet extrusion line, the rippled surface will usually reappear during thermoforming of the sheet into a finished article due to annealing effects. This excessive nerve is attributed to the elastic component of the viscoelastic melt and to polymer memory.

Attempts to improve the extrudability of AES compositions have led to the development of materials based on EPDM in which ethylidene norbornene (ENB) is employed as the non-conjugated diene termonomer in the EPDM. Such AES compositions produce a more nearly nerve-free sheet than AES based on DCPD-type EPDM. Unfortunately, AES based on ENB-type EPDM does not weather as well as AES based on DCPD-type EPDM.

In accordance with the present invention, by coextruding a relatively thin layer of AES based on DCPD-type EPDM onto a thermoplastic such as ABS (acrylonitrile-butadiene-styrene) one can overcome the prior difficulty of a rippled surface on the sheet and thermoformed part while providing the advantages of superior weatherability attributed to DCPD-type AES.

Coextrusion of AES based on DCPD-type EPDM onto a thermoplastic such as ABS may be carried out on a conventional coextrusion line using, for example, feedblock or multi-manifold die systems. In the multi-manifold die system the separate melt streams are joined in a die having suitable passages and join each other in the die prior to exit from the die. In the feedblock system the separate melt streams are joined in the feedblock and delivered to a conventional single manifold die where the layers are thinned and spread to a sheet. These techniques are described in U.S. Pat. Nos. 3,223,761, Raley, Dec. 14, 1965, 3,479,425, Lefevre et al, Nov. 18, 1969, and 3,557,265, Chisholm, et al, Jan. 19, 1971.

The DCPD AES is applied to one or both sides of an ABS or other thermoplastic sheet, usually depending on whether both sides of the finished article will be exposed to sunlight and thus in need of protection. Since the primary purpose of the AES layer is to protect the ABS or other substrate from the harmful effects of sunlight, the AES layer or layers are most effective when they contain pigments to make them more opaque.

The thickness of the AES layer or layers (usually 3 to 150 mils) that are necessary to adequately protect the ABS substrate or other substrate will depend upon the nature and level of pigments used, the severity of sunlight exposure, and on the expected lifetime of the finished product. Ordinarily the AES contains up to 10 parts by weight of pigment per 100 parts by weight of AES copolymer composition. In many cases a 10 or 15 mil or greater (e.g., 100 mils) AES layer containing at least 2 parts per hundred of titanium dioxide or more (e.g. 5 or 10 parts) will adequately protect the ABS or other thermoplastic beneath.

When determining the thickness of the AES layer or layers to be used in the extruded sheet, the effect of drawdown, or thinning of the AES layer during thermoforming of the finished part, must be taken into account.

Thicknesses of about 10 mils or less to 60 mils or more of AES based on DCPD may be coextruded onto one or both sides of an ABS or other substrate with a total sheet thickness of about 25 to 400 or 500 mils or more. A particularly preferred construction is a 20 to 40 mil layer of AES based on DCPD-type AES and containing 4 parts of titanium dioxide extruded onto one or both sides of 100 to 200 mils of ABS or the like.

The AES graft copolymer composition employed in the invention is described in U.S. Pat. No. 4,202,948, Peascoe, May 13, 1980 and is ordinarily based on a graft copolymer of resin-forming monomeric material (especially such monomers as vinyl aromatics, alkenoic nitriles, esters, or acids, or mixtures thereof, e.g., a mixture of styrene and acrylonitrile) on a particular olefin copolymer rubber spine, namely an unsaturated terpolymer (EPDM) containing dicyclopentadiene as the non-conjugated diene, as in rubbery terpolymers of ethylene, propylene, and dicyclopentadiene. In the preparation of such a graft copolymer, much of the resin-forming monomers become chemically grafted to the rubbery spine, but a certain amount of ungrafted resin is also formed (i.e., grafting efficiency is not 100%). In a preferred practice, additional separately prepared resin is blended with the product of the graft polymerization step. Typically, separately prepared styrene-acrylonitrile resin (SAN) is blended with the product of graft polymerization of styrene and acrylonitrile on dicyclopentadiene-type EPDM. However, it is also possible to make all of the resinous portion in situ during the graft polymerization. In either case the entire final SAN-EPDM product may be referred to as AES.

The AES employed in the invention is preferably prepared by blending two separate components, namely:

(A) a graft copolymer of styrene and acrylonitrile on EPDM rubber, particularly ethylene-propylene-dicyclopentadiene terpolymer rubber; and (B) separately prepared styrene-acrylonitrile resin.

Examples of the graft copolymer component (A) and the separately prepared resin component (B) are described in more detail in U.S. Pat. No. 4,202,948, Peascoe, May 13, 1980. The preferred graft copolymer (A) is prepared by graft copolymerizing (a) styrene and acrylonitrile in weight ratio of 80/20 to 65/35 on (b) a rubbery terpolymer of ethylene, propylene and dicyclopentadiene in which the weight ratio of ethylene to propylene is within the range of from 80/20 to 20/80. The Mooney viscosity of the terpolymer rubber (b) is preferably from 30 to 90 ML-4 at 257° F. and the iodine number of the rubber (b) preferably is from 10 to 50. The amount of (a) acrylonitrile/styrene is about 50% based on the weight of (a) plus (b).

The preferred separately prepared resin (B) is a copolymer of styrene and acrylonitrile in weight ratio of 80/20 to 65/35 having an intrinsic viscosity in dimethylformamide at 30° C. of at least 0.4. The amount of resin (B) in the AES is sufficient to provide an over-all ratio of resin to rubber in the range of from 90/10 to 65/35.

In a particularly valuable form the invention, an antioxidant is present during the graft copolymerization stage.

Component A (the graft copolymer) and component B (the separately prepared resin), are sheared or masticated together at elevated (fluxing) temperature, for example in a twin screw type of extruder-blender.

The ABS portion of the co-extrudate of the invention is based on any suitable acylonitrile-butadiene-styrene composition such as the well known graft copolymers of such resin-forming monomers as vinyl aromatics, alkenoic nitriles, ester or acids, or mixtures thereof, e.g., a mixture of styrene and acrylonitrile, on a rubbery spine which is a diene homopolymer (e.g., polybutadiene) or copolymer (e.g., butadiene-styrene, butadiene-acrylonitrile) or the like. Additional separately prepared resin may be blended with the graft copolymer to make the final ABS composition if desired.

In place of ABS, other thermoplastic resins may be used as the substrate, such as PVC (polyvinyl chloride), SAN (stryene-acrylonitrile), acrylic resins, or the like including thermoplastic blends such as a blend of styrene-acrylonitrile-maleic anhydride copolymer with polybutadiene or other rubbers.

The following example will serve to illustrate the practice of the invention in more detail.

EXAMPLE

A graft copolymer may be prepared as described in U.S. Pat. No. 4,202,948 (Example 2) referred to above.

A 10-gallon autoclave equipped with a thermometer and a motor stirrer is charged with 413 parts by weight of water, 0.27 parts by weight of Methocel K-100 (trademark; hydroxypropyl methylcellulose produced by Dow Chemical Company) 100 parts by weight of ethylene-propylene-dicyclopentadiene copolymer of 52/48 ethylene/propylene ratio, 10 iodine number and Mooney viscosity 60 ML-4 at 257° F., which has been ground to a Tyler mesh particle size 3, and a mixture of 75 parts by weight of styrene, 40 parts by weight of acrylonitrile, 3 parts by weight of Lupersol-11 (trademark; 75% t-butylperoxy pivalate in mineral spirits) as a polymerization initiator, and 1.0 part of antioxidant, e.g., octadecyl-3,5-di-tert-butyl-4-hydroxyhydrocinnamate.

The reaction mixture is heated to 80° F. for 1½ hours and then to 240° F. and kept at this temperature for another 1½ hours at which time the reaction mixture is cooled to room temperature and the graft copolymer recovered by filtering and drying overnight in an oven at 66° C. The resulting AES graft copolymer is designated Graft I in Table I, below.

For comparison, two other graft copolymers are similarly prepared, using EPDM's based on ethylidene norbornene (ENB) as the diene. There are designated Graft II and Graft III in Table I.

TABLE 1

| Graft | EPDM Type | E/P Ratio | ML-4 | $I_2$# |
|---|---|---|---|---|
| I | DCPD | 52/48 | 60 | 10 |
| II | ENB | 58/42 | 45 | 20 |
| III | ENB | 60/40 | 68 | 20 |

To make AES blends for weatherability testing, 46 parts of grafts, I, II and III and 54 parts of SAN resin (Tyril 880B, trademark, Dow Chemical Co.) together with 0.75 part each of Tinuvin P and Tinuvin 770 (UV stabilizers from Ciba-Geigy) were fluxed for 10 minutes at 90 RPM in a Rheocord (trademark) Type M Torque Rheometer made by Haake, Inc. and equipped with cam rotors. To evaluate weatherability, samples were cut from 70 mil compression moldings and exposed in Miami, Fla., at a 45° angle facing south. Chip impact was measured on the unexposed samples and on samples exposed for periods of 2, 4, 6, 9, 12, 18 and 24 months.

In the chip impact test, ½-inch wide by 70 mil strips are impacted on the exposed face with a conventional Izod pendulum. The test value is reported as inch-pounds per square inch of sample cross-section. Details of the test and its use in weatherability testing have been published in the proceedings of the SPE National Technical Conference, Nov. 18–20, 1980, p. 24.

Chip impact results for AES blends I, II and III before and after Florida exposure are given in Table 2. Note that blend I, based on DCPD EPDM, has much better impact retention after Florida exposure than either AES blend based on ENB EPDM (II or III).

TABLE 2

| | Chip Impact After Florida Exposure | | | | | | | |
|---|---|---|---|---|---|---|---|---|
| | | Months in Florida | | | | | | |
| Graft | Unaged | 2 | 4 | 6 | 9 | 12 | 18 | 24 |
| I | 238 | 237 | 243 | 232 | 195 | 190 | 169 | 164 |
| II | 269 | 242 | 230 | 173 | 134 | 125 | 111 | 106 |
| III | 222 | 200 | 222 | 230 | 185 | 143 | 135 | 116 |

It is well known that when two thermoplastics are coextruded, the melt viscosities of the two materials should not be too far apart so as not to disturb smooth laminar flow in the feedblock and die. In the example given below, the DCPD AES already described is coextruded onto Monsanto 752 (trademark) an extrusion grade of ABS which has a similar melt viscosity. If an AES is used which has a substantially higher or lower viscosity than the one described (for example, by varying the viscosity of the separately prepared SAN resin used in the AES blend), the ABS used as the substrate polymer will have to be chosen so that the melt viscosities at the coextrusion temperature (about 450° F.) continue to be reasonably matched.

The following example illustrates how the DCPD AES already described may be coextruded onto Monsanto 752 ABS to produce a sheet laminate of 25 mils AES over 100 mils ABS in which the sheet surface will be acceptably smooth.

A coextrusion line consisting of a 2½ inch main extruder and 1½ inch satellite extruder feeding through a coextrusion feedblock to a 14-inch flex-lip sheet die and conventional three-roll takeoff stack is operated under the conditions given below. ABS (Monsanto 752) is fed into the main extruder and AES is fed into the satellite extruder. The conditions are as follows:

| Main Extruder | |
| --- | --- |
| Zone 1 (feed) | 380° F. |
| 2 | 400 |
| 3 | 415 |
| 4 | 420 |
| 5 | 420 |
| Screw RPM 40 | |
| Satellite Extruder | |
| Zone 1 (feed) | 375° F. |
| 2 | 390 |
| 3 | 410 |
| 4 | 430 |
| Screw RPM 30 | |
| Feedblock Temperature | 430° F. |
| Die Temperature | 420° F. |
| Die Lip Setting | 0.125-inch |
| Takeoff Line | |
| Top nip | 0.125-inch |
| Bottom nip | 0.125-inch |
| Top roll temp. | 200° F. |
| Middle roll temp. | 230° F. |
| Bottom roll temp. | 200° F. |

What is claimed is:

1. A coextruded product having a total thickness of from 25 to 500 mils, and at least one surface layer having a thickness of from 3 to 150 mils of graft copolymer composition comprising a graft copolymer of resin-forming material selected from vinyl aromatic, alkenoic nitrile, alkenoic ester and alkenoic acid monomers on ethylene-propylene-dicyclopentadiene terpolymer rubber, said surface layer containing up to 10 parts by weight of pigment per 100 parts of graft copolymer composition.

2. A coextruded product as in claim 1 having an underlying layer of thermoplastic resin selected from acrylonitrile-butadiene-styrene, polyvinyl chloride, styrene-acrylonitrile, acrylic resin, and blend of styrene-acrylonitrile-maleic anhydride copolymer with polybutadiene rubber.

3. A coextruded product as in claim 2 in which the underlying layer is acrylonitrile-butadiene-styrene composition.

4. A coextruded product as in any of claims 1, 2 or 3 in which the resin-forming material in the graft copolymer is styrene-acrylonitrile.

5. A coextruded product having on one or both sides a surface layer 3 to 150 mils thick comprising graft copolymer composition containing up to 10 parts by weight of pigment per 100 parts by weight of graft copolymer composition comprising a graft copolymer of resin-forming material selected from vinyl aromatic, alkenoic nitrile, alkenoic ester and alkenoic acid monomers on ethylene-propylene-dicyclopentadiene terpolymer rubber, and an underlying layer of acrylonitrile-butadiene-styrene thermoplastic resin, the total thickness of the product being 25 to 500 mils.

6. A coextruded product as in claim 5 in which the rubber in the said graft copolymer composition has an ethylene:propylene weight ratio of from 80/20 to 20/80, a Mooney viscosity of from 30 to 90 ML-4 at 257° F., and an iodine number of from 10 to 50.

7. A coextruded product as in claim 6 in which the resin forming material in the graft copolymer is styrene-acrylonitrile in weight ratio of 80/20 to 65/35, and the ratio of resin to rubber is in the range of from 90/10 to 65/35.

* * * * *